United States Patent
Tsai

(10) Patent No.: US 8,035,653 B2
(45) Date of Patent: Oct. 11, 2011

(54) DYNAMICALLY ADJUSTABLE ELEMENTS OF AN ON-SCREEN DISPLAY

(75) Inventor: Leonard Tsai, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1384 days.

(21) Appl. No.: 11/588,800

(22) Filed: Oct. 27, 2006

(65) Prior Publication Data

US 2008/0111882 A1   May 15, 2008

(51) Int. Cl.
G09G 5/00 (2006.01)
G09G 5/02 (2006.01)
H04N 5/445 (2006.01)
H04N 5/50 (2006.01)
G06K 9/40 (2006.01)
G06K 9/60 (2006.01)

(52) U.S. Cl. ........ 345/592; 345/581; 345/630; 345/545; 348/563; 348/567; 348/569; 348/607; 382/254; 382/274; 382/305

(58) Field of Classification Search .......... 345/428, 345/581, 592, 601, 626, 629–630, 545–553; 348/497, 553, 563–565, 567, 569, 584–588, 348/607; 382/254, 274, 276, 305
See application file for complete search history.

(56) References Cited

U.S. PATENT DOCUMENTS

| | | | |
|---|---|---|---|
| 7,068,293 B2 * | 6/2006 | Wang | 345/698 |
| 7,176,929 B1 * | 2/2007 | Morrish | 345/545 |
| 7,191,402 B2 * | 3/2007 | Kim et al. | 715/723 |
| 2003/0184563 A1 * | 10/2003 | Wiant, Jr. | 345/629 |
| 2003/0189560 A1 | 10/2003 | Kang et al. | |
| 2004/0095358 A1 | 5/2004 | Takagi et al. | |
| 2004/0183823 A1 * | 9/2004 | Wang | 345/699 |
| 2005/0163225 A1 * | 7/2005 | Im et al. | 375/240.25 |
| 2006/0107214 A1 * | 5/2006 | Kim | 715/716 |
| 2006/0182366 A1 * | 8/2006 | Hsu et al. | 382/274 |
| 2007/0052733 A1 * | 3/2007 | Hirabayashi et al. | 345/661 |
| 2007/0070081 A1 * | 3/2007 | Tang et al. | 345/591 |
| 2007/0236607 A1 * | 10/2007 | Morris et al. | 348/563 |
| 2008/0002053 A1 * | 1/2008 | Kondo et al. | 348/441 |

FOREIGN PATENT DOCUMENTS

| | | |
|---|---|---|
| EP | 1684262 | 7/2006 |
| JP | 08211860 | 8/1996 |

* cited by examiner

Primary Examiner — Wesner Sajous

(57) ABSTRACT

A system for generating an on-screen display (OSD) is described. The on-screen display, which has a semitransparent background area, is overlaid on top of an image. The data which make up this image are stored in a buffer. An accumulator, connected to the buffer, is used to examine this data, and store information about it. An attached OSD module used the stored information to automatically adjust the semitransparent background of the OSD.

20 Claims, 4 Drawing Sheets

Flowchart 400

Display 200

Flowchart 400

DYNAMICALLY ADJUSTABLE ELEMENTS OF AN ON-SCREEN DISPLAY

BACKGROUND

Many electronic devices, particularly those with an attached or integrated display have extensive functionality available through the use of an on-screen display (OSD). On-screen displays are used for a variety of reasons, such as aesthetics, efficiency, and user comfort. For example, a digital television may only have four or five discrete buttons on the television itself, with perhaps an additional 20 to 30 buttons on an associated remote control. Between options related to audio and video configurations, input control, channel selection, digital video recorder functionality, and the like, the television may have several hundred discrete functions with which a user can interact. Providing a remote, or buttons on the television itself, with a one-to-one correlation of buttons to available functions would not be aesthetically pleasing, would not be an efficient use of hardware, and often can be intimidating to the end-user.

Instead, multi-level On-Screen Displays are utilized. While varying across manufacturer and application type, on-screen displays tend to have a number of common elements. In general, a background is laid over top, or in place of, the image shown on the display. Options, either in graphical or textual form, are displayed upon that background. In some applications, a solid color background is used, e.g., a single blue rectangle appears in the middle of the screen, and text or icons are displayed over top the rectangle. In other situations, a semitransparent background is used, such that at least some portion of the image on the display can be seen through the background. In most applications, the selection of background color, brightness, and transparency level are preset, and cannot be changed. In a very few applications, the user can manually choose one of several available schemes for the OSD, enabling them to choose from, for example, three or four color and transparency options, when setting up their device.

However, OSDs are not responsive to the image being shown on the display. Regardless of whether the on-screen image is dark or bright, the OSD does not change. This is a problem for several reasons. For example, if the OSD is using a lighter background, when the background image is also bright, the OSD text will be washed out and difficult to read. If the OSD uses a darker background, and the displayed image is dark, the image detail may not show through, and is blocked out by the OSD.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
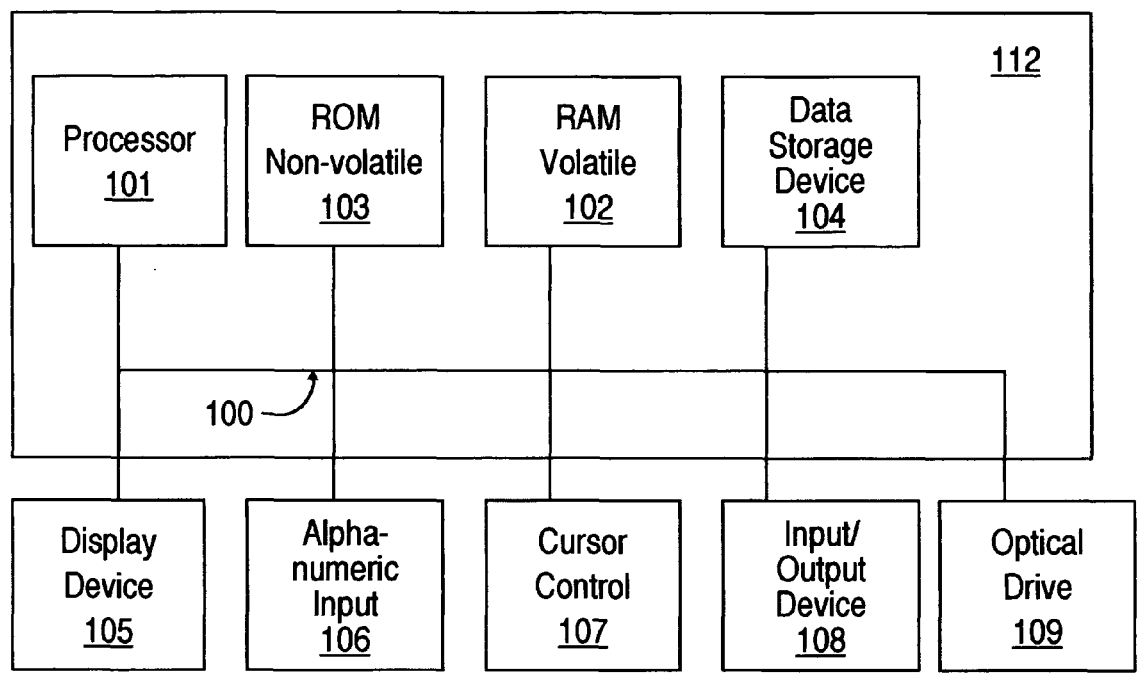
FIG. 1 depicts an exemplary computer system.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the appended claims. Furthermore, in the following detailed description of the present invention, numerous specific details are set forth in order to provide a thorough understanding of the present invention. However, it will be recognized by one skilled in the art that the present invention may be practiced without these specific details or with equivalents thereof.

Portions of the following description are presented and discussed in terms of a method. Although functions and sequencing thereof are disclosed in a figure herein (e.g., FIG. 4) describing the operations of this method, such functions and sequencing are exemplary. Embodiments are well-suited to performing various other functions or variations of the functions recited in the flowchart of the figure herein, and in a sequence other than that depicted and described herein.

Some portions of the following descriptions are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of optical, electrical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. In several embodiments, for example, a digital television or a personal video recorder (PVR) is utilized, in place of system 112. In some embodiments, system 112 is connected to a network attached storage device (NAT). Moreover, embodiments may be practiced on any system which can be configured to enable it, not just computer systems like computer system 112. It is understood that embodiments can be practiced on many different types of computer system 112. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also comprise an optional display device 105 coupled to bus 100 for displaying information to the computer user. Moreover, computer system 112 also comprises a data storage device 104 (e.g., hard disk drive) for storing information and instructions.

Computer system 112 also comprises an optional alphanumeric input device 106, an optional cursor control or directing device 107, signal communication interface (input/output device) 108, and video processor 109. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). In some embodiments, video processor 109 is incorporated into central processor 101. In other embodiments, video processor 109 is a separate, discrete component. In other embodiments, video processor 109 is incorporated into another component. In other embodiments, video processor 109 is included in system 112 in other ways.

In some embodiments, the appearance of the OSD is adjusted dynamically and automatically. For example, the transparency of the background for the OSD, which is adjusted via a process called alpha blending, is automatically set via the device, based upon the image currently being shown on the display.

Alpha blending is used in graphics, e.g., computer and digital television graphics, to create the effect of transparency. This is accomplished by combining a translucent foreground with a background color to create a transitional blend. Specifically, the foreground image is weighted using an alpha value, while the background image is weighted using the complement of the alpha value; the modified foreground and background images are then combined, to create the image displayed on the screen. This mathematical relationship is shown below, in Table 1.

TABLE 1

Alpha Blending $I_{blended} = \alpha I_{forground} + (1 - \alpha)I_{background}$ The selection of different alpha values will result in different blended image appearances. The higher the alpha value, the less transparent the foreground images, and the greater the weight of the foreground color on the blended image. With a lower alpha value, the blended image derives more of its appearance from the original background image.

In conventional approaches to OSDs, the alpha value is fixed. The device may only support a single alpha value for the OSD, or it may support several, from which the user selects during a setup process; in both cases, the alpha value used by the display will be the same, regardless of what currently is being displayed.

In some embodiments, a device with a display dynamically changes the alpha value, to better suit the current context. For example, a digital TV utilizing an embodiment can dynamically adjust the alpha value, so as to present an on-screen display that provides a better viewing experience. When the background image is bright, a slightly darker background for the OSD text can be used, to ease reading; when the background image is darker, a somewhat lighter background for the OSD can be used, to achieve better contrast without washing out the background image. In both cases, better contrast is achieved, which enables easier viewing and use.

In some embodiments, alpha values are dynamically adjusted according to each frame that passes across the display. In this way, the background for the OSD may be rapidly changing, according to what is currently being displayed. While the background color shifting nearly constantly, the text and/or icons over top the background will still be solid. This results in a nearly consistent viewing contrast for the OSD display, and a better overall OSD experience.

Furthermore, since the changes in the OSD are dynamic and programmable, devices incorporating embodiments can support enhanced viewing for visually impaired people, or can be configured to capture the user's attention during, for example, an emergency broadcast.

In some embodiments, dynamic alpha value determination is carried out by examining the image or sequence of images currently being displayed. For example, in some digital televisions, the complete image is built in a buffer before being displayed on the screen. Often, the frame on screen is one or two frames behind; this buffer time is often used for any picture preprocessing, e.g., picture enhancement or image stability. In these embodiments, because the entire image is already available in memory, examining the image is straightforward.

Every frame is passed through this image buffer. Information can be collected from these frames, e.g., a histogram, to enable some data to be collected about the images or scenes being displayed. For example, to determine if the scene is bright or dark, or if there is a lot of motion. Given this information, an appropriate alpha value can be calculated for the current scene, and a correspondingly appropriate OSD displayed. If, for example, and OSD is displayed over top of a television show with a static, blue background, an alpha value can be selected that will suppress blue, to provide for better contrast with the text or icons to be displayed.

In other applications, other approaches to data collection can be utilized. For example, when the electronic device displays only a single image, rather than a stream of video data like a television, in some embodiments, only the present image needs to be examined, before determining an appropriate alpha value.

Embodiments extend to any electronic device with a display unit capable of displaying an OSD or menu system, including, but not limited to, desktop computers, laptop computers, digital televisions, analog televisions, LCD displays, telephones, music playback and/or recording devices, cameras, personal digital assistants (PDAs), and the like.

Figure 2:
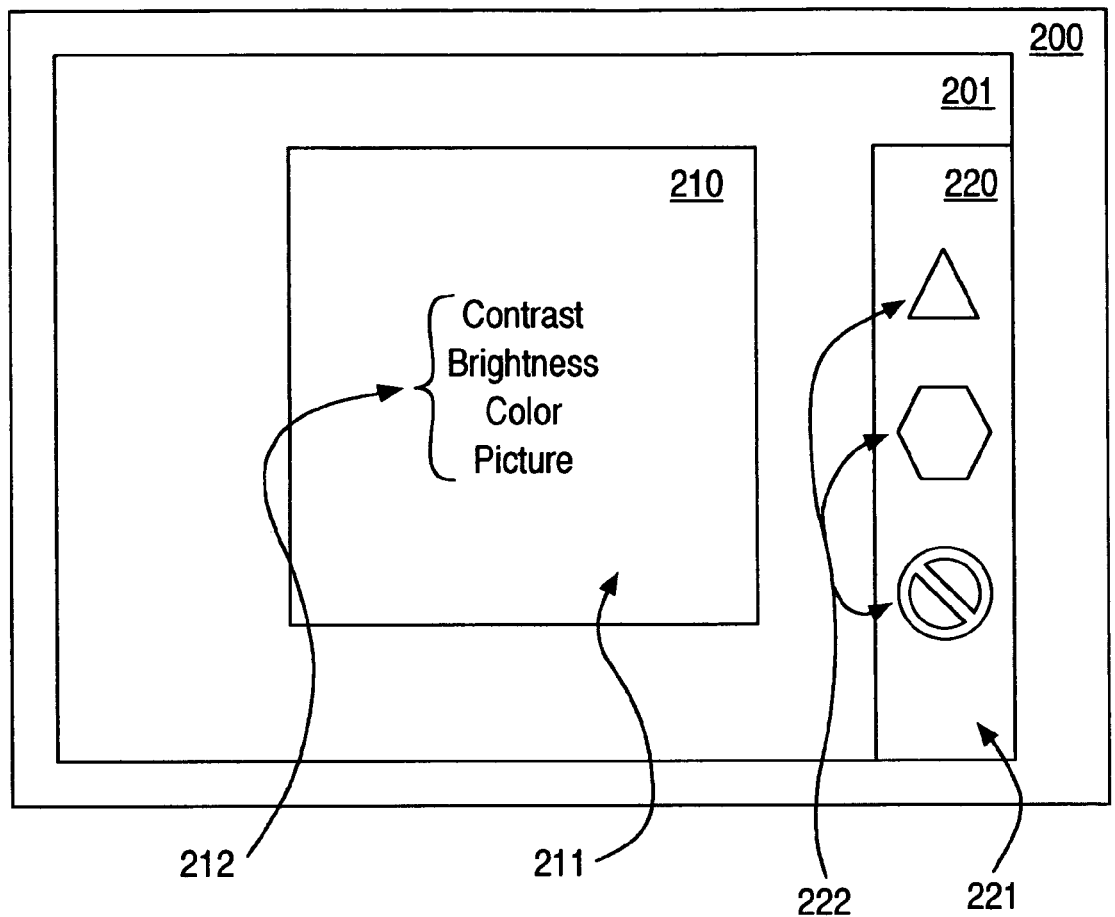
FIG. 2 depicts an exemplary display.

With reference now to FIG. 2, an exemplary display 200 is depicted, in accordance with one embodiment. Exemplary display 200 is shown as displaying image 201. Exemplary display 200 and image 201 are understood to be examples only. In other embodiments, a different configuration or layout of on-screen information can be utilized. Image 201 is partially occluded by an on-screen display (OSD) 210. OSD 210 comprises a background region 211, and text elements 212. Image 201 is also shown as being partially occluded by OSD 220. OSD 220 also comprises a background region 221, and a number of icons 222.

OSD 210 is representative of the type of on-screen display used by many embodiments, such as digital televisions. Background region 211 is overlaid on top of underlying image 201. Text elements 212 are on top of background region 211. Background region 211, in some embodiments, is semitransparent. In some such embodiments, the semitransparent nature of background region 211 is governed by and automatically, dynamically adjusting alpha value. In some of these embodiments, background region 211 is adjusted so as to provide contrast to text elements 212, in order to make them easier to read. In some of these embodiments, background region 211 is adjusted so as to improve the viewing experience.

OSD 220 is representative of the type of on-screen display used by some embodiments, such as digital cameras. Background region 221 is overlaid on top of underlying image 201. Icons 222 are on top of background region 221. Background region 221, in some embodiments, is semitransparent. In some such embodiments, the semitransparent nature of background region 221 is governed by automatically, dynamically adjusting an alpha value. In some of these embodiments, background region 221 is adjusted so as to provide contrast to icons 222, in order to make them easier to see. In some of these embodiments, background region 221 is adjusted so as to improve the viewing experience.

Figure 3:
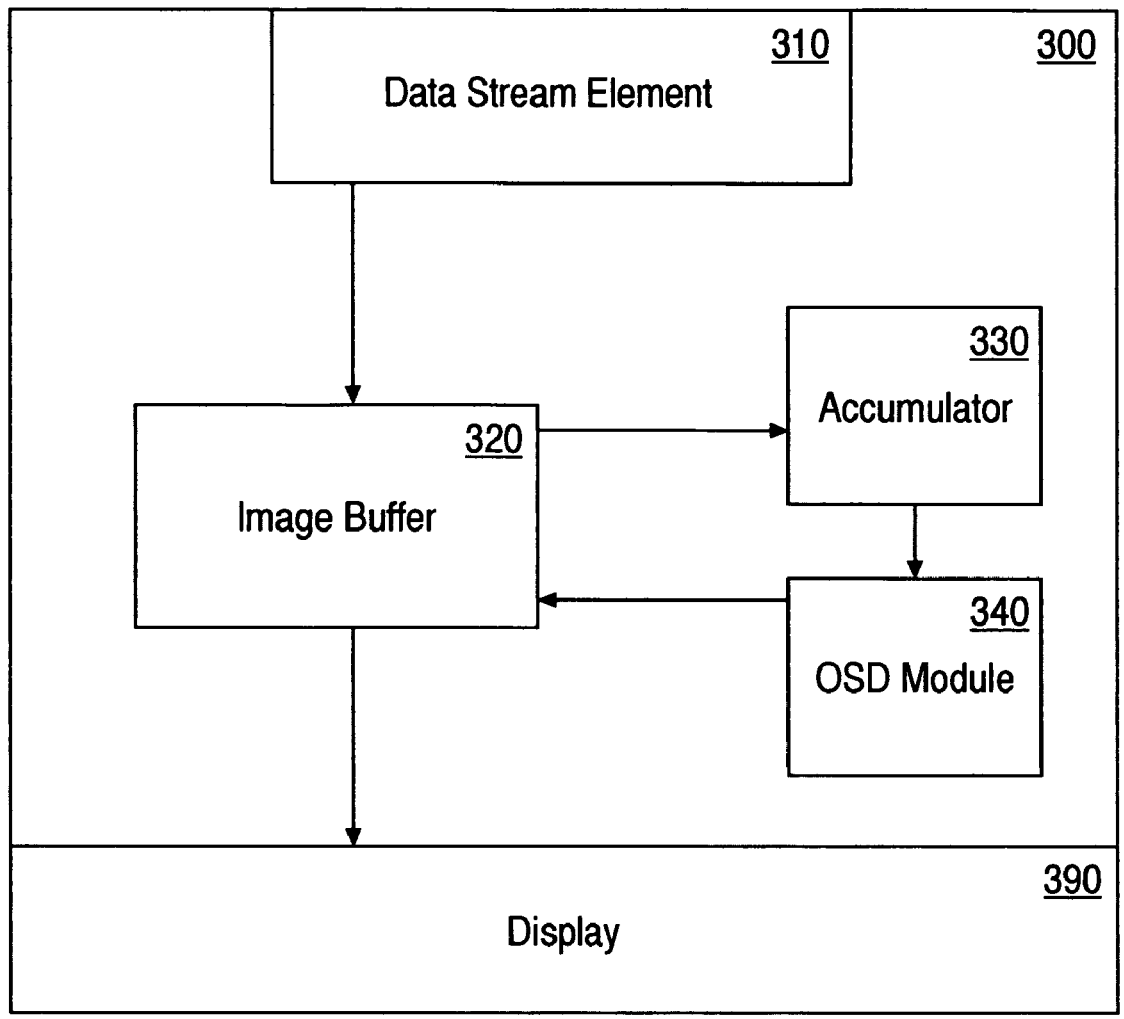
FIG. 3 depicts an electronic display, in accordance with embodiments.

With reference now to FIG. 3, an electronic display 300 is depicted, in accordance with one embodiment. While electronic display 300 is shown as incorporating a number of discrete, enumerated components, it is understood that it other embodiments, different, additional, or fewer components are utilized. In some embodiments, functions performed by one component may be divided across several components. In other embodiments, functions performed by several components may be incorporated into a single component.

Electronic display 300 is shown as having a data stream element 310. Data stream element 310, in the depicted embodiment, is an input to electronic display 300. In some embodiments, data stream element 310 is a connection to a source of digital image data, e.g., a DVD player. In other embodiments, data stream element 310 can be made up of a combination of other components, e.g., a lens and aperture arrangement for a digital camera. Electronic display 300 receives image data via data stream element 310.

Electronic display 300 comprises an image buffer 320. As shown, image buffer 320 receives image data from data stream element 310. In some embodiments, the image data is prepared for displaying in image buffer 320, e.g., an entire frame of image data is assembled, processed, and stored until ready for display.

Electronic display 300 is also shown as comprising accumulator 330. In the depicted embodiment, accumulator 330 examines the assembled frame of image data stored in image buffer 320. In some embodiments, data is collected from the stored image, and used in calculating an alpha value.

Electronic display 300 comprises OSD module 340. OSD module 340 uses the data stored by accumulator 330 about the images to be displayed by electronic display 300, in order to calculate an appropriate alpha value. In some embodiments, OSD module 340 can write back to image buffer 320, so as to insert an on-screen display into the frame of image data to be displayed. In other embodiments, OSD module 340 is directly connected to display element 390.

Electronic display 300 comprises display element 390. Display element 390 displays the image data assembled by image buffer 320.

Figure 4:
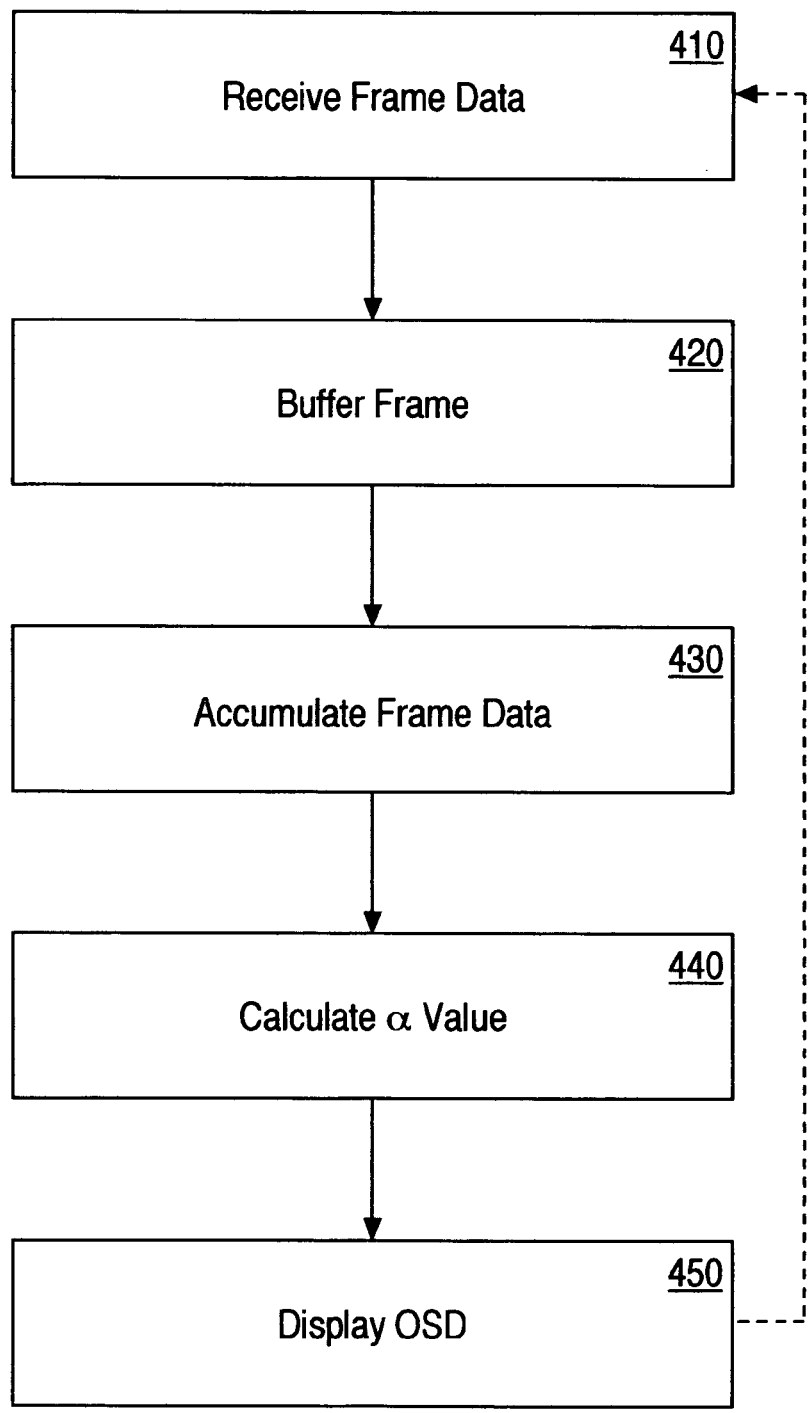
FIG. 4 depicts a flowchart of a method of dynamically adjusting an on-screen display, in accordance with embodiments.

With reference now to FIG. 4, a flowchart 400 of a method of dynamically adjusting an on-screen display is depicted, in accordance with one embodiment. Although specific functions are disclosed in flowchart 400, such functions are exemplary. That is, embodiments of the present invention are well suited to performing various other (additional) functions or variations than those recited in flowchart 400. It is appreciated that the blocks in flowchart 400 may be performed in an order different than presented, and that not all of the functions in flowchart 400 may be performed.

With reference now to block 410, an electronic display receives a frame of image data. For example, electronic display 300, a digital television, may receive image 201, a single frame of a television program, via a data stream 310, a cable connection.

At block 420, the electronic display buffers the frame of image data received; in some embodiments, this comprises performing any preprocessing of the image data of which the electronic display is capable. Continuing the previous example, electronic display 300 assembles image 201 and stores it in image buffer 320.

With reference now to block 430, the electronic display accumulates frame data. In some embodiments, this involves averaging pixel luma data for the area to be covered by the OSD. For example, electronic device 300, and accumulator 330, determine the average pixel luma data for the portion of image 201 to be covered by OSD 210. This information is stored in accumulator 330.

At block 440, the electronic display determines appropriate parameters for the OSD. In some embodiments, in order to determine an appropriate transparency level for the OSD, this determination involves calculating an appropriate alpha value, and the corresponding complement value. In several such embodiments, this calculation is influenced by the frame data stored in the accumulator. For example, if image 201 is a brightly lit desert scene, the data stored in accumulator 330 will indicate a brightly lit scene. Accordingly, OSD module 340 will select an alpha value such that background region 211 will provide enhanced contrast for text elements 212.

At 450, the electronic display displays the OSD. In some embodiments, the OSD is inserted into the frame buffer, e.g., as a preprocessing step. In other embodiments, the OSD is directly displayed on the display element. In further embodiments, the electronic display is displayed in other ways. Continuing the above example, OSD module 340 inserts OSD 210 into image buffer 320, and image 201 is displayed on display element 390 with OSD 210 displayed over it.

In some embodiments, including several where multiple frames of image data are displayed in succession, e.g., a television, the method described in flowchart 400 is looped. In this way, the background for the on-screen display is constantly and dynamically adjusted to match the currently displayed frame. In other embodiments, the method described by flowchart 400 is intermittently repeated, e.g., every 10 frames of image data. In further embodiments, the frequency of execution of this method will vary.

What is claimed is:

1. A system for generating an on-screen display (OSD) with a semitransparent background, said system comprising:
    a frame buffer, for storing image frame data;
    an accumulator, coupled to said frame buffer, for storing information about said image frame data; and
    an OSD module, coupled to said accumulator, for automatically adjusting said semitransparent background, with reference to said accumulator.

2. The system of claim 1, wherein said information about said image frame data comprises average pixel luma data.

3. The system of claim 1, wherein said OSD module is for dynamically adjusting said semitransparent background, with reference to said accumulator.

4. The system of claim 1, wherein said automatically adjusting comprises calculating an alpha value.

5. The system of claim 1, wherein said OSD is generated for display on a television.

6. The system of claim 5, wherein said television comprises a high-definition digital television.

7. The system of claim 1, wherein said OSD is generated for display on a telephone.

8. The system of claim 1, wherein said OSD is generated for display on a computer.

9. A method of dynamically adjusting an on-screen display (OSD), comprising:
    receiving frames of image data;
    examining said frames of image data to calculate a display variable; and
    dynamically adjusting, by a processor in response to said display variable, an appearance of a background region of the OSD.

10. The method of claim 9, further comprising:
    generating said OSD for display according to the dynamically adjusted appearance.

11. A method of dynamically adjusting an on-screen display (OSD), comprising:
    receiving a first frame of image data;
    gathering display data from said first frame of image data;
    determining, by a processor with reference to said display data, a first desirable OSD;
    receiving a second frame of image data;
    gathering additional display data from said second frame of image data;
    determining, by the processor with reference to said additional display data, a second desirable OSD; and
    dynamically adjusting said first desirable OSD to match said second desirable OSD.

12. The method of claim 9, wherein said receiving comprises successively placing said frames of image data into an image buffer.

13. The method of claim 9, wherein dynamically adjusting the appearance of the background region of the OSD comprises dynamically adjusting a semitransparent background region of the OSD.

14. A method of dynamically adjusting an on-screen display (OSD), comprising:
    receiving a first frame of image data;
    gathering display data from said first frame of image data; and
    determining, by a processor with reference to said display data, a first desirable OSD,
    wherein said determining said first desirable OSD comprises determining a semitransparent background region, and
    wherein said gathering comprises calculating average pixel luma values for a portion of said first frame of image data.

15. The method of claim 14, wherein said calculating average pixel luma data for said portion of said first frame of image data comprises calculating average pixel luma values for a region to be partially occluded by said semitransparent background region.

16. A computer-readable storage medium having computer-readable program code embodied therein for causing a computer system to execute a method of generating an on-screen display (OSD), said method comprising:
    storing an image being displayed, said image comprising electronic image data, in a memory module;
    examining said electronic image data, to calculate a display variable; and
    automatically adjusting an appearance of a background region of said OSD, with reference to said display variable, to improve a display characteristic.

17. The computer-readable storage medium of claim 16, wherein said examining said electronic image data comprises calculating an alpha value.

18. The computer-readable storage medium of claim 17, wherein said adjusting comprises using said alpha value to adjust a semitransparent background region of said OSD.

19. The computer-readable storage medium of claim 16, wherein said examining said electronic image data comprises calculating a contrast value, said contrast value related to said OSD and said image being displayed.

20. The computer-readable storage medium of claim 16, wherein said examining said electronic image data comprises calculating a brightness value, said brightness value related to said OSD and said image being displayed.

* * * * *